United States Patent
Choi

(10) Patent No.: US 8,055,398 B2
(45) Date of Patent: Nov. 8, 2011

(54) METHOD OF REDUCING CURRENT CONSUMPTION OF ELECTRIC HYDRAULIC POWER STEERING SYSTEM FOR VEHICLE

(75) Inventor: Hoon Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 559 days.

(21) Appl. No.: 12/331,967

(22) Filed: Dec. 10, 2008

(65) Prior Publication Data
US 2009/0292420 A1   Nov. 26, 2009

(30) Foreign Application Priority Data
May 20, 2008   (KR) .................. 10-2008-0046661

(51) Int. Cl.
  *B62D 6/00*   (2006.01)
  *G11C 8/00*   (2006.01)
  *G06F 19/00*  (2006.01)

(52) U.S. Cl. ............................. 701/22; 701/41; 323/285

(58) Field of Classification Search .................. 701/22, 701/41, 42, 36, 1; 323/285, 268; 365/230.06; 324/76.77
See application file for complete search history.

(56) References Cited

U.S. PATENT DOCUMENTS

| 5,032,996 | A  | * | 7/1991 | Shiraishi | 701/41 |
| 6,062,123 | A  | * | 5/2000 | Obata et al. | 91/375 A |
| 6,353,402 | B1 | * | 3/2002 | Kanamori | 341/118 |
| 7,253,594 | B2 | * | 8/2007 | Paul et al. | 323/268 |

FOREIGN PATENT DOCUMENTS

| JP | 08-230705 | 9/1996 |
| JP | 10-250613 | 9/1998 |
| JP | 11-348802 | 12/1999 |
| JP | 2002-114165 | 4/2002 |
| JP | 2006-007916 | 1/2006 |
| JP | 2006-327542 | 12/2006 |

\* cited by examiner

*Primary Examiner* — Tan Q Nguyen
(74) *Attorney, Agent, or Firm* — Edwards Angell Palmer & Dodge LLP; Kongsik Kim

(57) ABSTRACT

A method of reducing current consumption of an electric hydraulic power steering system for a vehicle includes determining whether or not a steering wheel is manipulated after an engine is started, and activating a sleep mode if it is determined that the steering wheel is not manipulated and if a vehicle speed is lower than a reference value for activating the sleep mode, or if it is determined that the steering wheel is manipulated and if an amount of current conducted in a motor, a vehicle speed and a steering angular velocity are lower than respective reference values for a predetermined time. According to the method, it is possible to reduce current consumption when the steering wheel is not manipulated and improve the vehicular fuel efficiency.

4 Claims, 3 Drawing Sheets

METHOD OF REDUCING CURRENT CONSUMPTION OF ELECTRIC HYDRAULIC POWER STEERING SYSTEM FOR VEHICLE

CROSS-REFERENCE TO RELATED APPLICATION

This application claims the benefit of Korean Patent Application No. 10-2008-0046661 filed on May 20, 2008, the disclosure of which is incorporated herein by reference.

TECHNICAL FIELD

The present disclosure relates to a method of reducing current consumption of an electric hydraulic power steering system for a vehicle.

BACKGROUND ART

When a driver turns a steering wheel of a vehicle travelling or stopped in one direction, the vehicle wheels, which are in contact with a road surface, are turned in the same direction. A great amount of load is applied to the vehicle wheels turned by the steering wheel due to friction against the road surface. For this reason, a conventional steering wheel system is equipped with an electric hydraulic power steering (EHPS) system. This EHPS system is adapted to sense amounts of torque generated from the steering wheel and the vehicle wheels when the driver turns the steering wheel, and allow a powering means to generate repulsive force corresponding to a deviation between the torque amounts so as to turn the vehicle wheels, thereby facilitating manipulation of the steering wheel.

The conventional EHPS system, however, has drawbacks. In particular, the electric hydraulic pump of the EHPS system, which feeds hydraulic pressure to a drive unit coupled with the steering wheel, is driven even when the steering wheel is not manipulated, resulting in unnecessary power consumption. Further, the current consumed when the steering wheel is not manipulated acts as an electric load to the vehicle, lowering fuel efficiency.

The above information disclosed in this Background Art section is only for enhancement of understanding of the background of the invention and therefore it may contain information that does not form the prior art that is already known in this country to a person of ordinary skill in the art.

SUMMARY OF DISCLOSURE

The present invention has been made to solve the foregoing problems with the prior art, and therefore embodiments of the present invention provide a method of reducing current consumption of an electric hydraulic power steering system for a vehicle.

According to an aspect of the invention, there is provided a method of reducing current consumption of an electric hydraulic power steering system for a vehicle. The method includes: determining whether or not a steering wheel is manipulated after an engine is started; and activating a sleep mode if it is determined that the steering wheel is not manipulated and if a vehicle speed is lower than a reference value for activating the sleep mode, or if it is determined that the steering wheel is manipulated and if an amount of current conducted in a motor, a vehicle speed and a steering angular velocity are lower than respective reference values for a predetermined time.

According to embodiments of the present invention, the method of reducing current consumption of an electric hydraulic power steering system for a vehicle controls an amount of motor control current according to an amount of current conducted in a motor, a vehicle speed and a steering angular velocity conducted in a motor, so that it can reduce unnecessary current consumption of the motor when the steering wheel is not manipulated, and increase fuel efficiency of the vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

The above and other features of the invention will be discussed in detail infra.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF EXEMPLARY EMBODIMENT

Now, an exemplary embodiment of the present invention will be described in detail with reference to the accompanying drawings. In the following description of the present invention, a detailed description of known functions and components incorporated herein will be omitted when it may make the subject matter of the present invention rather unclear.

Figure 1:
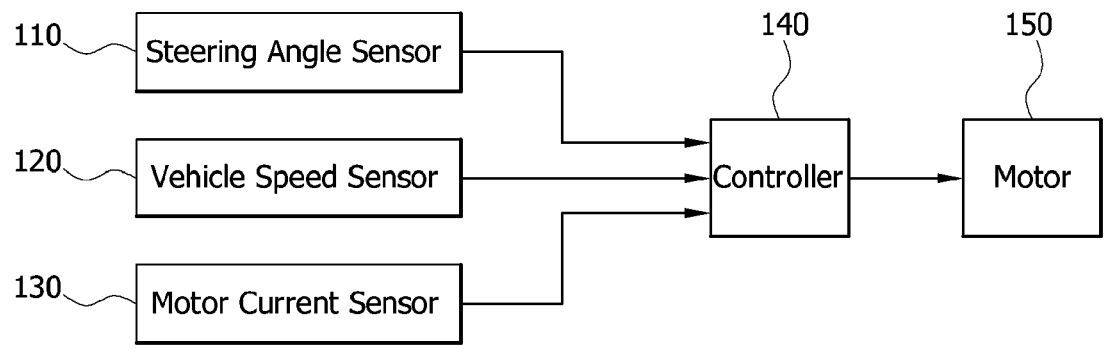
FIG. 1 is a block diagram illustrating the operational principle of an EHPS system for a vehicle according to an exemplary embodiment of the present invention.

FIG. 1 is a block diagram illustrating the operational principle of an EHPS system for a vehicle according to an exemplary embodiment of the present invention.

Referring to FIG. 1, first, steering angular velocity, vehicle speed, and current conducted in a motor are detected using a steering angle sensor 110, a vehicle speed sensor 120, and a motor current sensor 130, respectively.

A controller 140 receives signals in response to detection of the steering angular velocity, the vehicle speed, and the current conducted in the motor from the respective sensors 110, 120 and 130 through controller area network (CAN) communication. When the received signals meet preset condition (i.e. condition for activating or releasing a sleep mode), the controller 140 controls the amount of current conducted in the motor by activating or releasing the sleep mode to hereby control the motor 150.

Here, the sleep mode refers to a mode for sharply lowering the amount of current conducted in the motor 150 when no steering force is required to be assisted by the motor 150, and thereby reducing unnecessary current consumption of the motor 150.

For reference, as the amount of current conducted in the motor 150 increases, the torque of the motor 150 increases. Thus, if a steering angular velocity is great, the vehicle can be easily steered when the driver applies weak force to the steering wheel.

Typically, when the motor 150 is driven, the maximum amount of current conducted in the motor 150 is about 80 A. The current conducted in the motor 150 is consumed to a level of about 6 to 7 A when the vehicle is not steered, which has been mentioned as the problem of the related art.

Accordingly, when the controller 140 controls the motor 150 in the sleep mode, the current conducted in the motor 150 becomes about 1.2 A, so that the current consumption can be reduced.

The condition for activating or releasing the sleep mode set for the controller 140 will be described later in detail.

Figure 2:
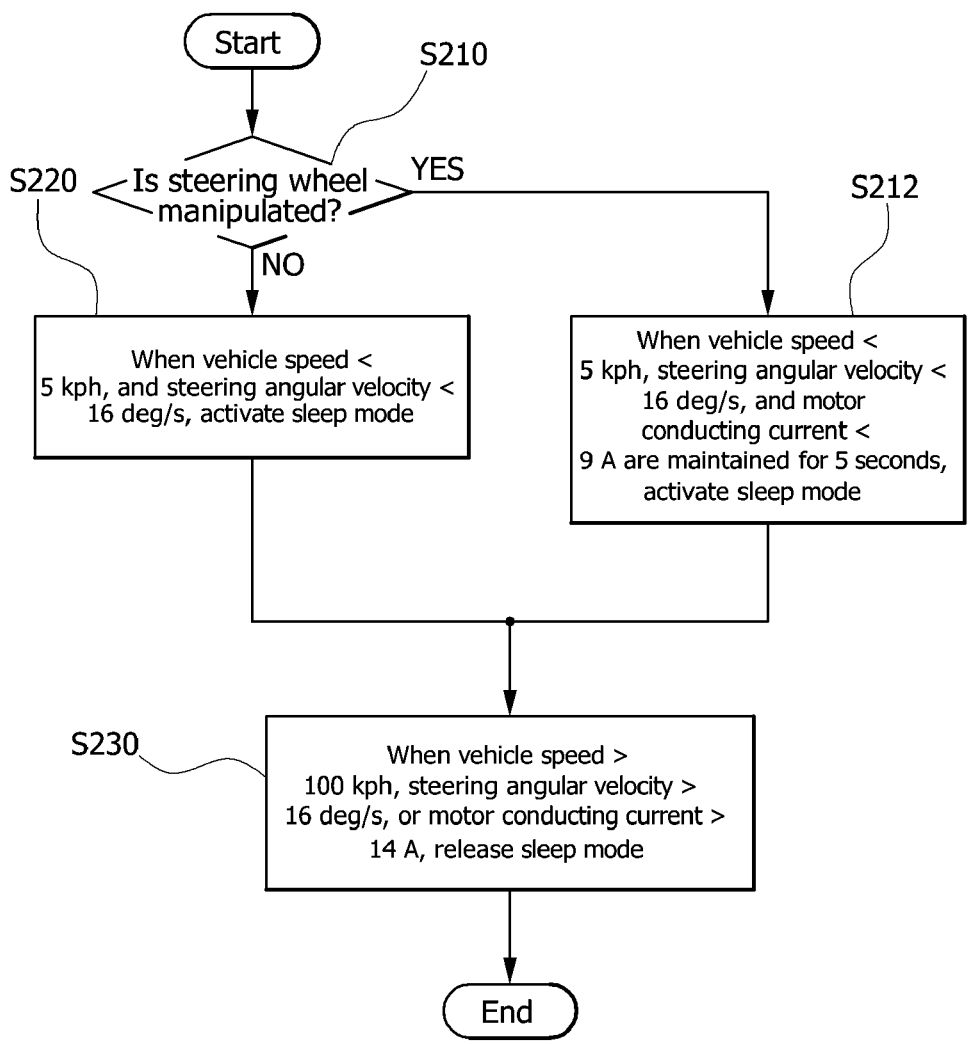
FIG. 2 is a flowchart illustrating a method of reducing current consumption of an EHPS system for a vehicle according to an exemplary embodiment of the present invention.

FIG. 2 is a flowchart illustrating a method of reducing current consumption of an EHPS system for a vehicle according to an exemplary embodiment of the present invention.

First, after an engine is started, it is determined whether or not the driver manipulates the steering wheel (S210).

At this time, it can be seen through an engine revolution per minute (RPM) signal of the sensor installed on the vehicle whether or not the engine is started. Further, it can be seen through the steering angle sensor 110 as described in FIG. 1 whether or not the driver manipulates the steering wheel. The steering angle sensor 110 is generally installed adjacent to a rotary shaft of the steering wheel.

Meanwhile, if it is determined that the driver manipulates the steering wheel, and if the vehicle speed, the steering angular velocity, and the amount of current conducted in the motor, which are received by the controller 140, are lower than respective reference values for activating a sleep mode for a predetermined time, the sleep mode for reducing unnecessary current consumption of the motor is activated (S212).

Here, the reference values for activating the sleep mode are comparative reference values set for the controller 140 such that the amount of current conducted in the motor 150 is controlled to be reduced by about 1.2 A. In detail, the vehicle speed is 5 kph, the steering angular velocity is 16 deg/s, the current conduced in the motor is 9 A, and the predetermined time is 5 seconds.

Thus, the state in which the vehicle speed <5 kph, the steering angular velocity <16 deg/s, and the amount of current conduced in the motor <9 A continues 5 seconds, the controller 140 causes the motor 150 to activate the sleep mode such that the amount of current conduced in the motor 150 is reduced. The reference values for activating the sleep mode must not be limited to these values, and thus can be properly changed according to need of a user.

At this time, if it is determined that the driver manipulates the steering wheel, the motor 150 activates the sleep mode. The reason is as follows. Although the driver manipulates the steering wheel, the steering angular velocity may be less than 16 deg/s while the vehicle is travelling at a low speed, that is, if a range within which the steering is substantially performed may be small. This will be regarded as simple steering allowance rather than a steering will of the driver. However, in this case, preferably, parameters of the amount of current conducted in the motor (9 A or lower) and the time (5 seconds) are additionally applied to improve control reliability.

Meanwhile, in step S210, if it is determined that the driver does not manipulate the steering wheel, and if the vehicle speed is less than 5 kph, for instance if the vehicle is in a stop state or in a low-speed state, the controller 140 activates the sleep mode for reducing current consumption of the motor 150 (S220).

In this state, since the steering angular velocity received from the steering angle sensor 110 remains unchanged, it is determined that the driver does not manipulate the steering wheel. Afterwards, although the driver manipulates the steering wheel, the controller 140 releases the sleep mode according to magnitude of the steering angular velocity, otherwise determines the condition for activating the sleep mode when the driver manipulates the steering wheel as described above, and thus activates the sleep mode.

Meanwhile, after the sleep mode is activated, if any one of the vehicle speed, the steering angular velocity, and the amount of current conducted in the motor exceeds a corresponding reference value for releasing the sleep mode, the sleep mode is preferably set to be released.

Here, the reference values for releasing the sleep mode are 100 kph for the vehicle speed, 16 deg/s for the steering angular velocity, and 14 A for the amount of current conducted in the motor. If it is determined that any one of the reference values for releasing the sleep mode exceed the corresponding value, the sleep mode is released (S230). The reference values for releasing the sleep mode must not be limited to these values, and thus can be properly changed according to need of a user.

Figure 3A:
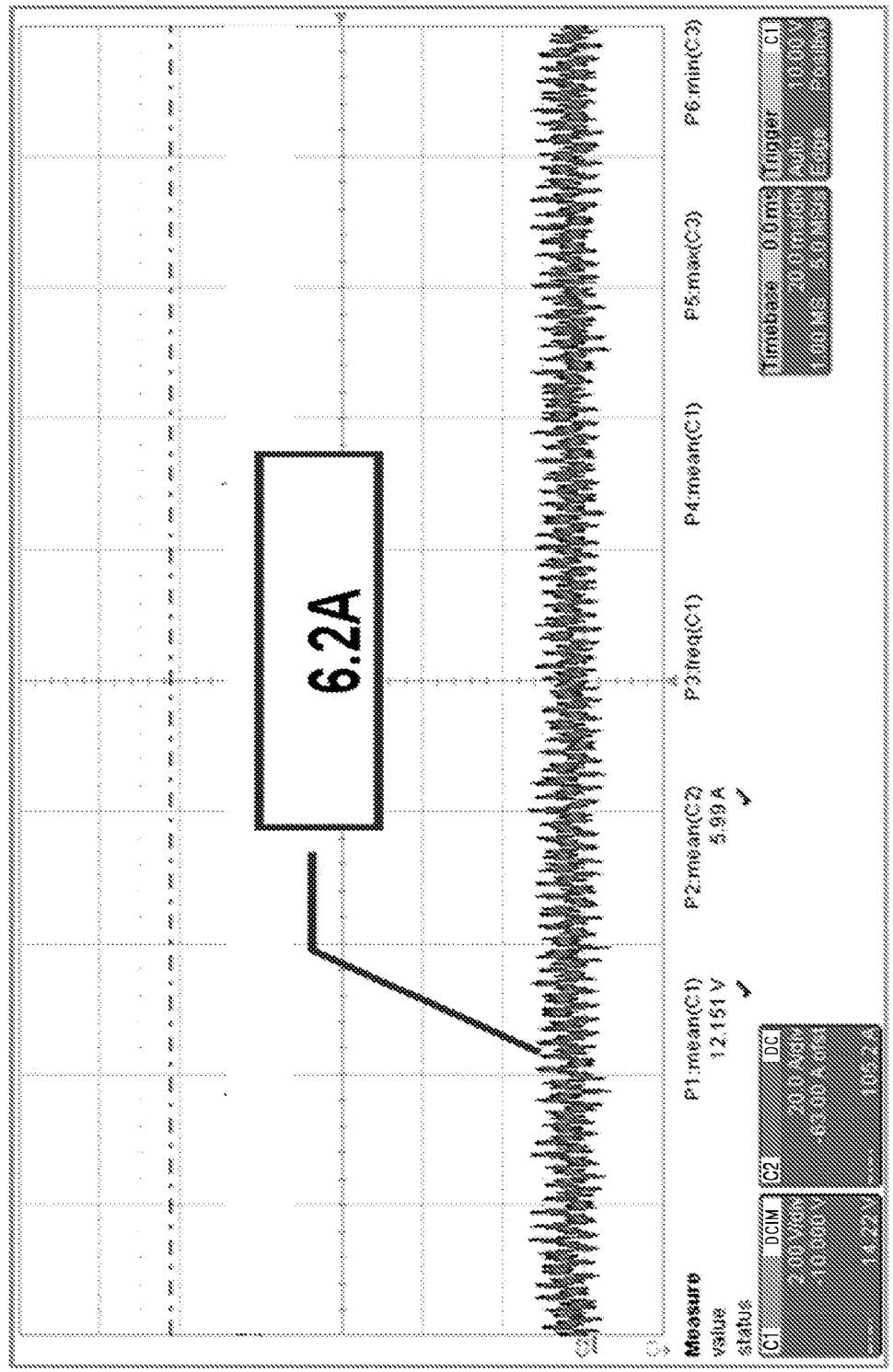
FIGS. 3A and 3B are graphs depicting the change of motor control current when the present method is applied.
Figure 3B:
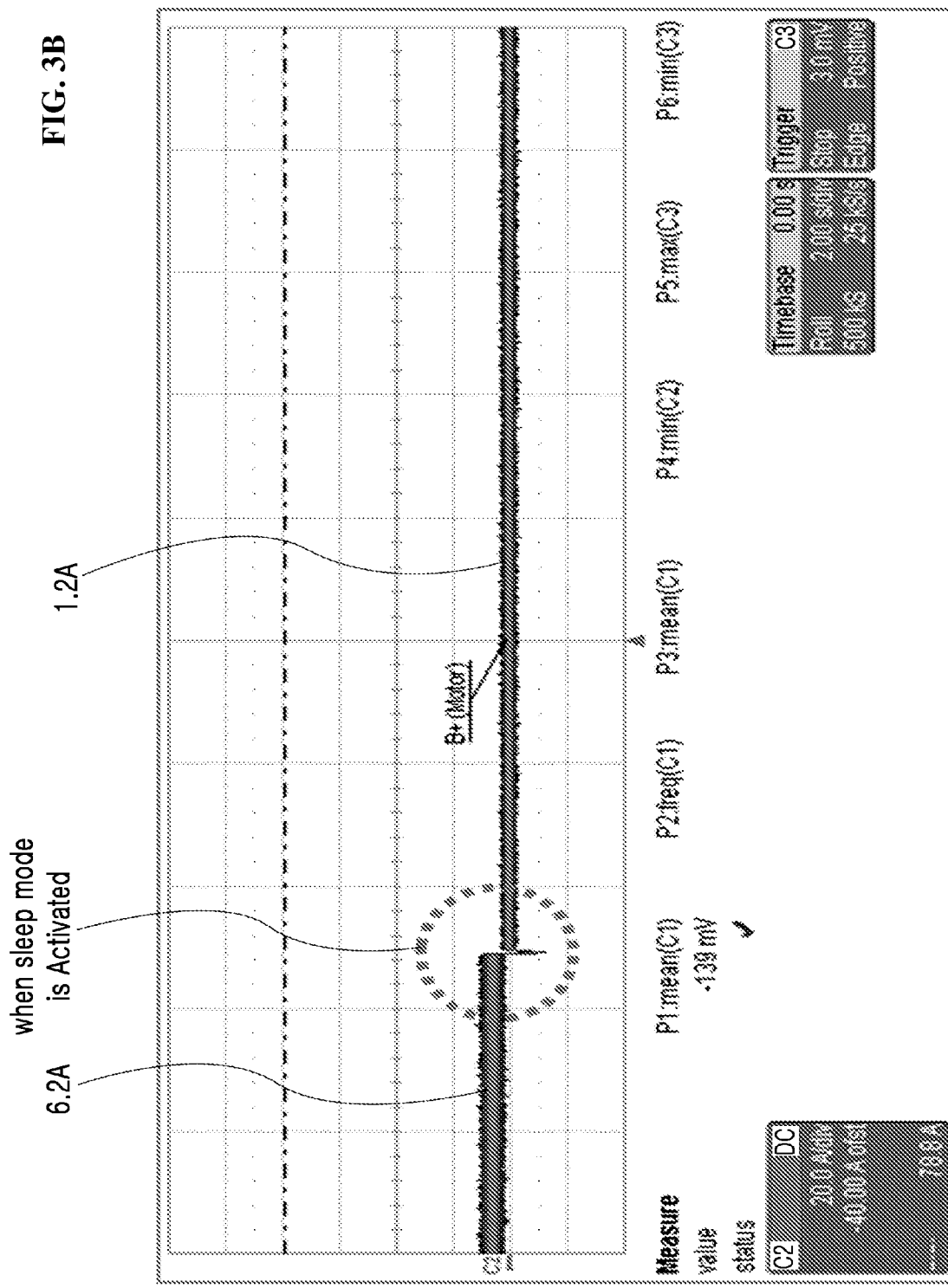

FIGS. 3A and 3B are graphs depicting the change of motor control current when the present method is applied. FIG. 3A shows motor control current before the present method is applied. FIG. 3B shows motor control current after the present method is applied.

Referring to FIG. 3A, when the steering wheel is not manipulated, the motor control current is about 6.2 A, in which state much current is continuously consumed even when the driver does not manipulate the steering wheel, resulting in an unnecessary electric load and lowering fuel efficiency.

Referring to FIG. 3B, on the other hand, when the steering wheel is not manipulated, the motor control current falls down from about 6.2 A to about 1.2 A. The reduced amount of current is maintained until the condition for releasing the sleep mode (e.g., the vehicle speed of 100 kph or higher, the steering angular velocity of 16 deg/s or higher, or the amount of current conducted in the motor of 14 A or more) is satisfied, thereby remarkably improving fuel efficiency.

While the present invention has been described with reference to the particular illustrative embodiments and the accompanying drawings, it is not to be limited thereto. Accordingly, the foregoing embodiments can be suitably modified and altered, and such applications fall within the scope and spirit of the present invention that shall be defined by the appended claims.

What is claimed is:

1. A method of reducing current consumption of an electric hydraulic power steering system for a vehicle, comprising:
   determining whether or not a steering wheel is manipulated after an engine is started; and
   activating a sleep mode
   if it is determined that the steering wheel is not manipulated and if a vehicle speed is lower than a reference value for activating the sleep mode, or
   if it is determined that the steering wheel is manipulated and if an amount of current conducted in a motor, a vehicle speed and a steering angular velocity are lower than respective reference values for a predetermined time.

2. The method according to claim 1, wherein the reference value of the vehicle speed for activating the sleep mode is 5 kph, the reference value of the steering angular velocity for activating the sleep mode is 16 deg/s, the reference value of the amount of current conducted in the motor for activating the sleep mode is 9 A, and the predetermined time is 5 seconds.

3. The method according to claim 1, further comprising, after activating the sleep mode, releasing the sleep mode if any one of the vehicle speed, the steering angular velocity, and the amount of current conducted in the motor exceeds a corresponding reference value for releasing the sleep mode.

4. The method according to claim 3, wherein the reference value of the vehicle speed for releasing the sleep mode is 100 kph, the reference value of the steering angular velocity for releasing the sleep mode is 16 deg/s, and the reference value of the amount of current conducted in the motor for releasing the sleep mode is 14 A.

* * * * *